United States Patent [19]

Tsuchihashi

[11] Patent Number: 4,490,660

[45] Date of Patent: Dec. 25, 1984

[54] SAFETY SYSTEM AND METHOD FOR A ROBOT

[75] Inventor: Akira Tsuchihashi, Nagareyama, Japan

[73] Assignee: Hitachi, Ltd., Toyko, Japan

[21] Appl. No.: 501,993

[22] Filed: Jun. 7, 1983

[30] Foreign Application Priority Data

Jun. 7, 1982 [JP] Japan ................................. 57-96257

[51] Int. Cl.³ ............................................ G05B 23/02
[52] U.S. Cl. .................................... 318/565; 250/561;
 901/3; 901/23; 364/513; 318/563; 318/568;
 318/640
[58] Field of Search ................. 250/561, 222.1, 222.2,
 250/215; 901/3, 23, 43, 49; 364/184, 513;
 318/563, 565, 568, 640

[56] References Cited

U.S. PATENT DOCUMENTS

| 4,146,924 | 3/1979 | Birk et al. ............................. 318/568 |
| 4,150,326 | 4/1979 | Engelberger .......................... 318/568 |
| 4,370,705 | 1/1983 | Imazeki et al. ....................... 364/184 |
| 4,398,233 | 8/1983 | Bala et al. ............................ 901/49 X |
| 4,433,325 | 2/1984 | Tanaka et al. ..................... 250/222.1 |
| 4,449,084 | 5/1984 | Meno .................................... 318/640 |

Primary Examiner—B. Dobeck
Attorney, Agent, or Firm—Antonelli, Terry & Wands

[57] ABSTRACT

A safety system and method for industrial robots includes a detection arrangement having a detection field covering the area of reach or operation of the robot. Detection data obtained through the detecting arrangement in each of predetermined operation positions of the robot is compared with the detection data indicative of the normal or correct detection field in the same operation position. The movement of the robot to the next operation position is prohibited when a difference of a level exceeding a predetermined level is obtained during the comparison.

20 Claims, 4 Drawing Figures

SAFETY SYSTEM AND METHOD FOR A ROBOT

BACKGROUND OF THE INVENTION

The present invention relates to a safety system and method for preventing any accident which may occur during operation of a robot.

At present, industrial robots can accurately simulate the motion of human hands and, hence, have acquired acceptance as excellent replacements for human laborers, particularly in the fields of automation which could never be achieved by conventional machine technology, as well as in the area of simple monotonous operations and those operations taking place under severe working conditions which operations could not be sustained by human laborers. In fact, many robots are actually used in various production lines.

Most of the industrial robots are adapted to operate in accordance with a predetermined sequence or to play back a motion in accordance with the data content of a teaching device. Once the playing back operation is started by, for example, the setting of the object to be worked (referred to as "work", hereinunder), the operation of the manipulator is successively performed until a series of steps in accordance with the taught data content is completed.

The aforementioned robots are subject to the possibility of accident as a result of contact between the movable part or tool on the robot and a person or any obstacle which may accidently come into the area of reach or movement of the robot during the playback operation or automation operation of the robot. The accident may also be caused by incorrect contact between the tool and work when the work is improperly set.

In order to avoid the possibility of such accidents, hitherto, safety measures have been taken such as the demarcation of a danger zone around the robot so as to keep persons away from the area of reach of the robot by, for example, the setting up of a fence.

These conventional safety measures, however, require additional space for the safety zone and impair the efficiency of various necessary operations such as the setting of the work, or the inspection and maintenance of the robot. In addition, these conventional measures are ineffectual in avoiding the danger when, for example, a person accidentally steps into a danger zone or when an obstacle is improperly placed in the zone.

SUMMARY OF THE INVENTION

It is, therefore, an object of the present invention to provide a safety system and method for industrial robots which overcome the disadvantages of the prior arrangements.

It is another object of the present invention to provide a safety system and method for industrial robots which is capable of eliminating the occurrence of accidents without requiring additional space for a safety zone and without necessitating the setting up of a fence or the like.

According to the present invention, there is provided a safety system and method for industrial robots including a detecting arrangement having a detecting or field of vision containing the area of reach or area of operation of the robot. Data relating to the detecting field or field of vision is obtained through the detecting arrangement for each predetermined motion of the robot and is compared with predetermined data corresponding to the detecting or vision field obtained when there is no obstacle. When a difference of a level exceeding a predetermined level is found between the data obtained through the detecting arrangement and the predetermined data, the movement of the robot to the next position of operation is prohibited.

Thus, in the safety system and method of the invention, the confirmation of safety, as well as the judgment as to whether to allow the robot or manipulator to move to the next step, is made for each step of playback or automatic operation of the robot. It is, therefore, not necessary to delimit a wide danger zone nor to step up a fence. Accordingly, the invention provides a highly reliable safety system for industrial robots, capable of performing controlled and precise operations in a safe manner.

These and other objects, features and advantages of the invention will become clear from the following description taken in conjunction with the accompanying drawings.

DESCRIPTION OF THE PREFERRED EMBODIMENTS

Figure 1:
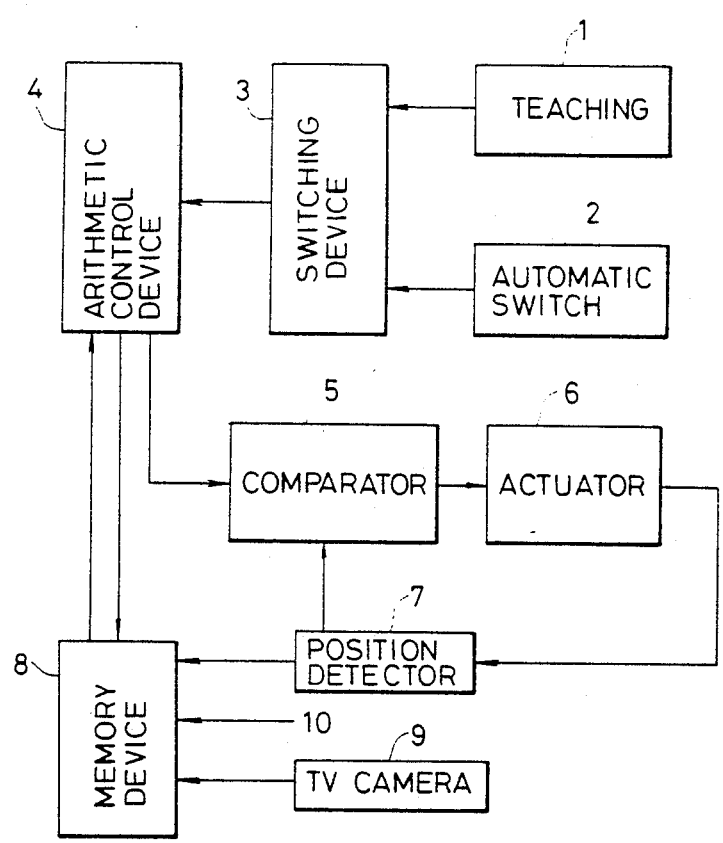
FIG. 1 is a block diagram of an embodiment of a safety system for a robot in accordance with the present invention.

FIG. 1 shows a control system of a playback type robot, including a safety device in accordance with an embodiment of the present invention. The control system includes a teaching device 1, automatic switch device 2 for playback control, an operation mode change-over switch 3, an operation controller (computer) 4, a comparator 5, an actuator 6 for driving a manipulator, a position detector 7, a memory device 8, a TV camera 9, and an input 10 for inputting answerback signals from peripheral equipment.

In the teaching mode, the teaching device 1 is operated and the operation mode is switched to the teaching mode by the change-over switching device 3. In consequence, the operation controller 4, which is an arithmetic control device, produces an operation signal in accordance with a control signal delivered by the teaching device according to the data content thereof for each operational step and operates an actuator 6 through a comparator 5.

Figure 2:
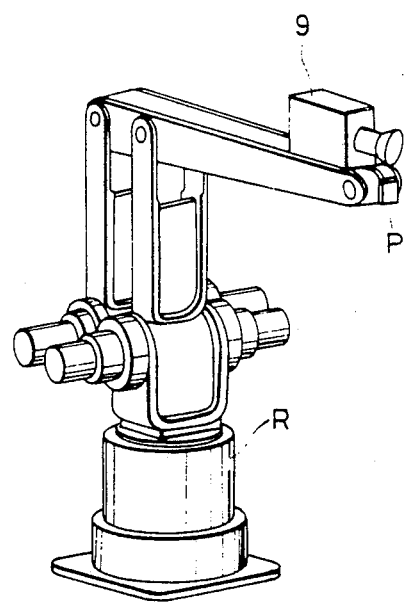
FIG. 2 is a perspective view showing an example of a mounting of a TV camera on a robot.

The position control object portion P of the robot R, as shown in FIG. 2, is actuated by the actuator 6, and the position of this portion P is detected by the position detector 7. The position detected by the position detector 7 is fed back to the comparator 5 so that the manipulator or object portion is brought to the predetermined command position. Meanwhile, the arithmetic operation controller 4 picks up via the memory device 8, for example, at each time of receipt of a teaching step completion signal from the teaching device 1 for each step, a signal from the position detector 7 and other various control signals necessary for the present operational step. These signals are stored in a predetermined memory area of the memory device 8. Simultaneously, the arithmetic operation controller 4 effects a control for writing in the memory device 8 so that different memory areas are designated for different operational steps.

Therefore, the positions of the position control object portion P of the robot R in respective steps of movement of the robot and various control data associated therewith are stored in different memory areas, until the teaching device 1 completes the teaching of the steps in accordance with a predetermined sequence of operation.

After the completion of the teaching, the automatic switch device 2 produces a signal to operate the change-over switching device 3 to switch the operation mode to the playback mode. Subsequently, a start signal is produced by the automatic switch device 2 so that the arithmetic operation control device 4 reads out the successive positions from corresponding memory areas in the memory device 8 starting from the first memory area. The actuator 6 is operated in response to the thus read out positions to successively control the position of the position control object portion P of the robot R to make the robot perform the necessary tasks.

The above-described operation of the playback type robot is well known.

As shown in FIG. 2, a TV camera 9 is mounted on a portion of the robot R in the vicinity of the position control object portion P of the robot or a part of a manipulator (not shown) provided on the position control object portion P so that the detection field or field of vision of the TV camera 9 covers a predetermined area including the movable part of the manipulator, particularly the wrist thereof. Thus, the TV camera can pick up the image of the movement of the manipulator together with the background or peripheral scenery, during the teaching operation mode of the robot and during playing back operation of the same. The memory device 8 is constructed to store a predetermined number of frames of image signals (video signals) picked up by the TV camera 9.

The arithmetic operation controller 4 picks up the image signals from the TV camera via the memory device 8, for example, in the form of independent frames in each of the above-mentioned steps or in selected ones of the above-mentioned steps, and stores the image signals in predetermined memory areas within the memory device 8. This operation is performed simultaneously with the writing of the position signal derived from the position detector 7 and the various control signals for the present step in the memory 8.

Then, as the operation mode is switched to the playback mode, he arithmetic operation controller 4 picks up the present image signals in the form of independent frames from the TV camera 9 in each of the steps of the playback operation via the memory 8, for example. The image signals thus picked up are then written in a buffer frame memory provided in one of the memory areas of the memory device 8. Then, the present signals of one frame written in the buffer memory and the image signals of one frame of the corresponding step as obtained in the teaching mode are read out in the form of independent picture elements or in the form of groups of picture elements. These two image signals are then compared with each other for each of the picture elements or for the groups of picture elements.

The arithmetic operation controller 4 allows the robot to take the next step of operation only when the comparison indicates that there is no substantial difference between these two image signals. However, when there is a difference in excess of a predetermined level of difference between the two image signals, the arithmetic operation controller 4 operates to prohibit the robot to move to the next step and initiates an alarm operation as required.

Figure 3:
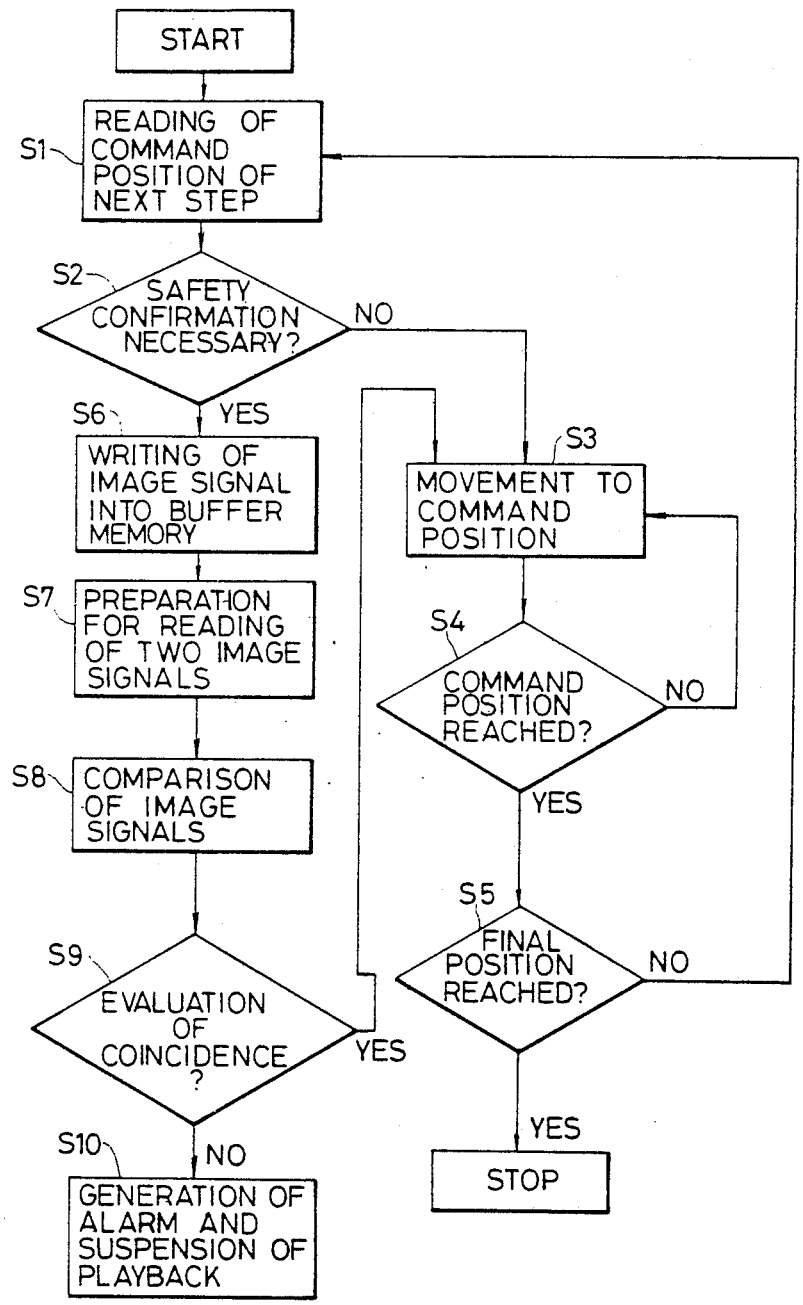
FIG. 3 is a flow chart of operation of the embodiment as shown in FIGS. 1 and 2.

The above-described operation of the safety system during the playback operation will be more fully understood from the following description taken with specific reference to FIG. 3 showing the flow chart of the operation.

As the playback operation is commenced, the position date is read out from the memory device 8 in a step S1, and a judgment is made in the next step S2 as to whether the position for confirming the safety is reached. There are two types of safety confirmation. Namely, a first type in which the confirmation is made in all of the positions or steps of operation of the robot manipulator and a second type in which the safety confirmation is made only in selected steps of operation of the manipulator. In the latter case, each control signal which is to be written in the memory device in each step of the teaching mode contains a discrimination signal concerning the necessity of the safety confirmation, so that the pick up of the frame of image signals from the TV camera is omitted in the step which does not require the safety confirmation. Thus, in the playing back operation, the discrimination signal is examined in the step S2 of the flow chart to determine whether or not the present step of manipulator operation requires the safety confirmation. It will be understood that the step S2 of the flow chart can be dispensed with if the safety system is intended to have a safety confirmation in all steps of the manipulator operation. In such a case, the operation proceeds from the step S1 directly to step S6.

If the result of the checking in the step S2 of the flow chart is "NO", i.e., when the present step of the manipulator operation requires no confirmation of safety, steps S3 and S4 are taken in which, as in the case of an ordinary playback operation, an operation is effected to attain a coincidence between the actual position of the manipulator and the position data read out from the memory device 8. This operation is repeated until a checking result "YES" is obtained in a checking step S5, i.e., until the manipulator reaches the final position of the present step in the playback operation.

If an affirmative answer "YES" is obtained in the step S2, i.e., when the present step of manipulator operates requires a safety confirmation, the process proceeds from the step S2 to the step S6 mentioned before. In the step S6, the frame of image signals presently available through the TV camera 9 is written in the buffer frame memory. Then, the process proceeds to a next step S7 in which preparation is made for the reading out of the frame of image signals which are stored in the corresponding step in the course of the teaching mode and the stored frame of image signals is written in the buffer frame memory. In the step S8 of the flow chart, the two frames of image signals are compared with each other for each of the picture elements or for each of the groups of picture elements, and the result of the comparison is evaluated in the next step S9 of the flow chart. When the answer derived through the step S9 is "NO", i.e., when a difference greater than a predetermined level of difference of comparison exists between two frames of image signals, the process proceeds to the next step S10 in which an instruction is given to temporarily stop the playback operation and to activate a suitable alarming device as required.

The difference between the signals representative of the detected field of view of the TV camera 9 as obtained in each step in the teaching mode and the signals representative of the detected field of view of the TV camera 9 as obtained in each step in the course of the playback operation is caused, for example, when a person comes into the area of reach or operation of the manipulator or when an obstacle is accidentally placed within such area. The difference may also be caused as a result of the work to be processed robot being set in a incorrect manner. The difference in the field of view automatically detected and the movement of the manipulator to the next step is prohibited, so that the occurrence of an accident is avoided and prevented without fail.

When the playback operation is suspended by the safety device, a suitable alarm device is activated to inform the operator of the suspension of operation. Therefore, the operator can restart the playback operation by taking the necessary corrective measures such as the removal of the obstacle.

In the above-described embodiment, it is possible to confirm the safe operation of the robot minutely and accurately because the safety confirmation can be made for each of the steps of the manipulator operation during the playback operation. Therefore, the safety system of the present invention enables a robot operation with a high reliability for avoiding any danger.

Figure 4:
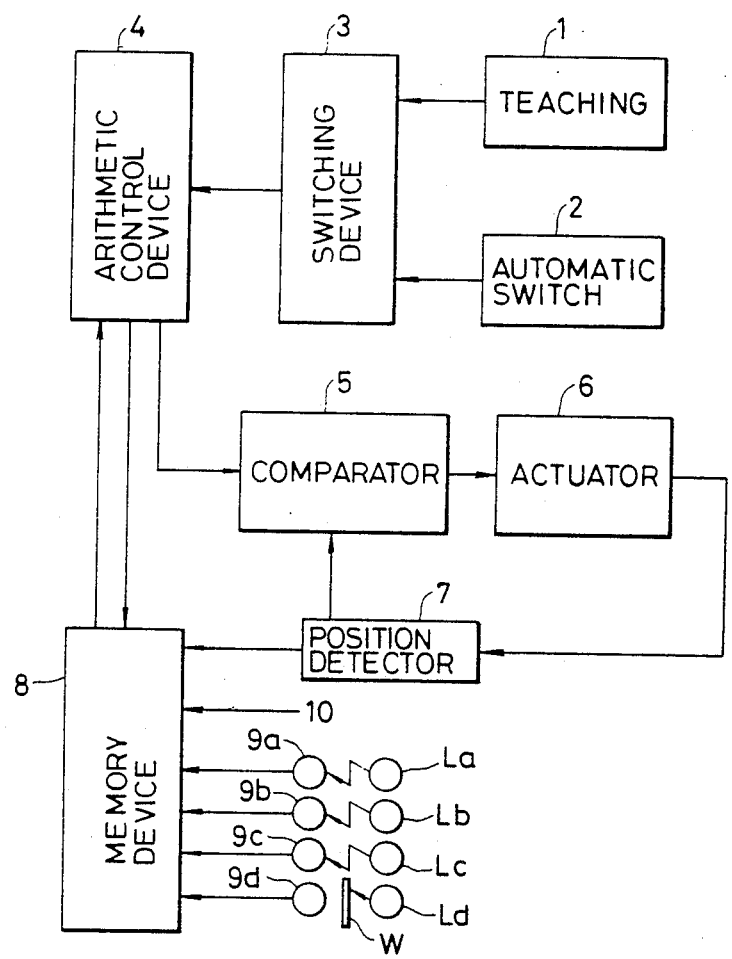
FIG. 4 is a block diagram showing a different embodiment of the invention.

Although, in the above-described embodiment, the confirmation of safety is made through comparing frames of image signals obtained through the TV camera 9, the safety confirmation can be obtained by other means than a TV camera, as illustrated in the embodiment of FIG. 4.

In the arrangement shown in FIG. 4, at least two photoelectric detectors 9a to 9d covering different detection areas are provided to output signals indicative of information of the detection area, and the safety confirmation is made by conducting a comparison between the signals obtained during the teaching mode through these photoelectric detectors 9a to 9d and those signals obtained in the course of the playback operation of the robot. Symbols La to Ld designate light-emitting elements. In FIG. 4, the light beams emitted from the light-emitting elements La to Lc are received by the corresponding photoelectric detectors 9a to 9c but the light beam from the light-emitting element Ld is interrupted by the work W and cannot reach the corresponding photoelectric detectors 9d.

In this robot, the danger zone, i.e., the reach or effective operation area of the manipulator is changed in accordance with the movement of the manipulator. Therefore, a TV camera or photoelectric detectors are mounted on the movable part of the manipulator so that the detection of any obstacle in the danger zone is made regardless of the change in the danger zone in accordance with the motion of the manipulator. Thus, the safety confirmation is made for the danger zone peculiar to each step of operation of the manipulator. Therefore, the manipulator is not stopped solely for the reason such as an approach of a person to the robot manipulator but the operation of the manipulator is suspended only when any accident is expected in the next step of operation of the manipulator. It is, therefore, possible to attain a high reliability operation of the industrial robot.

Although not mentioned specifically, an important factor in the operation of the safety system is the selection of the threshold level of judgment between accordance and discordance of two independent image signals. It is, therefore, desirable that the threshold level be adjustable so that the safety confirmation can be made with the optimum sensitivity.

It is also possible to compare the two kinds of image signals in the form of binary codes to permit the determination of the accordance or discordance by a pattern recognition technique. The technique for the binary coding of image signals is described in U.S. Pat. No. 4,136,957 and no further explanation is considered necessary.

Although the invention has been described through specific terms, the described embodiments are not exclusive and various changes and modifications may be imparted thereto without departing from the scope of the invention which is limited solely by the appended claims.

What is claimed is:

1. In an industrial robot of the playback type having a position control object portion for moving to successive positions in accordance with successive steps as taught in a teaching mode, a safety system comprising detecting means having a detecting field of view containing at least a part of the robot and providing detection data indicative of the detected field of view, memory means for storing detection data of the detecting means at least in selected ones of the successive positions corresponding to the successive steps in the teaching mode, means for reading, at least in selected steps of the playback operation, the detection data of a corresponding step from the memory means and for comparing the read-out detection data with present detection data from the detecting means obtained in the present step during the playback operation, and means responsive to the comparing means for controlling further movement of the robot.

2. A safety system according to claim 1, wherein the controlling means includes means for prohibiting the movement of the position control object portion of the robot to the successive position corresponding to the next step of the playback operation when the comparing means provides a difference of comparison exceeding a predetermined level, the memory means storing the detection data in each of the successive positions, and the reading means reading out the detection data in each step of the playback operation.

3. A safety system according to claim 2, wherein the controlling means enables movement of the position control object portion of the robot to the successive position corresponding to the next step of the playback operation when the comparing means provides a difference of comparison which does not exceed the predetermined level.

4. A safety system according to claim 2, wherein the prohibiting means includes means for initiating an alarm.

5. A safety system according to claim 1, wherein the detecting means includes a plurality of photoelectric detector means having different detection areas within a predetermined field of view containing at least a part of the robot.

6. A safety system according to claim 1, wherein the detecting means includes TV camera means for providing image signals of the field of view as the detection data.

7. A safety system according to claim 6, wherein the TV camera means is mounted on a movable part of the robot.

8. A safety system for an industrial robot having a position control object portion in which successive positions to be taken by the position control object portion are stored, the safety system comprising detecting means having a detecting field of view covering the region of effective operation of the robot and providing detection data indicative of the detected field of view, memory means for storing the detection data from the detecting means at least in selected positions corresponding to respective successive positions of the position control object portion, means for reading at least in selected positions of the position control object portion during operation of the robot in an automatic operation mode, the detection data stored in the memory means and for comparing the read-out detection data corresponding to the present position of the position control object portion with detection data provided by the detecting means of the present position of the position control object portion, and means responsive to the comparing means for controlling further positioning of the position control object portion in accordance therewith.

9. A safety system according to claim 8, wherein the controlling means includes means for prohibiting the movement of the position control object portion to the next successive portion in accordance with the results of the comparing means, the memory means storing the detection data in each of the successive positions, and the reading means reading out the detection data in each position in the automatic operation mode.

10. A safety system according to claim 9, wherein the prohibiting means prohibits movement of the position control object portion when the comparing means provides a difference of comparison exceeding a predetermined level.

11. A safety system according to claim 9, wherein the prohibiting means includes means for initiating an alarm.

12. A safety system according to claim 10, wherein the controlling means enables movement of the position control object portion when the comparing means provides a difference of comparison which does not exceed the predetermined level.

13. A safety system according to claim 8, wherein the detecting means includes photoelectric detector means.

14. A safety system according to claim 8, wherein the detection means includes TV camera means providing image signals as the detection data.

15. A safety system according to claim 14, wherein the TV camera means is mounted on a movable part of the robot.

16. A safety method for preventing accidents during automatic operation of an industrial robot having a position control object portion in which successive positions to be taken by the position control object portion are stored, the method comprising the steps of detecting in a detection field of view covering the region of effective operation of the robot and providing detection data in accordance therewith, storing detection data for at least selected ones of the positions corresponding to the respective successive positions to be taken by the position control object portion, reading out the stored data for at least selected ones of the successive positions of the position control object portion during operation of the robot in an automatic operation mode, comparing the read-out detection data corresponding to the present position of the position control object portion with detection data of the present position of the position control object portion, and controlling the movement of the position control object portion in accordance with the results of the comparison so as to avoid accidents when persons and objects are improperly placed within the effective operation region of the robot.

17. A safety method according to claim 16, wherein the step of controlling includes prohibiting the movement of the position control object portion of the robot to the position corresponding to the next successive position of operation when the results of comparison is a difference exceeding a predetermined level, the step of storing includes storing detection data for each position, and the step of reading includes reading out the stored data for each of the successive positions.

18. A method according to claim 17, wherein the step of controlling includes enabling movement of the position control object portion when the results of comparison is a difference which does not exceed the predetermined level, and the step of prohibiting includes the initiating and alarm.

19. A safety method according to claim 17, wherein the step of detecting includes providing a plurality of photoelectric detectors having detection areas containing at least a part of the robot.

20. A safety method according to claim 17, wherein the step of detecting includes providing a TV camera mounted on a part of the robot for providing image signals as the detection data.

* * * * *